United States Patent [19]

Goldstein

[11] Patent Number: 4,917,461
[45] Date of Patent: Apr. 17, 1990

[54] ACHROMATIC INFRARED RETARDER

[76] Inventor: Dennis H. Goldstein, 2410 Edgewater Dr., Niceville, Fla. 32578

[21] Appl. No.: 298,072

[22] Filed: Jan. 11, 1989

[51] Int. Cl.$^4$ ............................ G02B 5/04; G02B 7/18
[52] U.S. Cl. ...................................... 350/286; 350/1.1; 350/394
[58] Field of Search ..................... 350/1.1, 286, 394; 356/367

[56] References Cited

U.S. PATENT DOCUMENTS

| | | | |
|---|---|---|---|
| 2,406,798 | 9/1946 | Burroughs | 350/286 |
| 3,360,323 | 12/1967 | Weisman et al. | |
| 3,363,962 | 1/1968 | Vogel | |
| 3,765,746 | 10/1973 | Ashley et al. | 350/394 |
| 4,514,047 | 4/1985 | Haskal et al. | 350/394 |
| 4,556,292 | 12/1985 | Mathyssek et al. | 350/394 |
| 4,595,833 | 6/1986 | Sting | |
| 4,747,667 | 5/1988 | Tanaka et al. | 350/167 |

OTHER PUBLICATIONS

Clapham et al.; "Some Applications of Thin Films to Polarization Devices"; *Applied Optics*, v. 8, No. 10; 1969; pp. 1965–1974.
*Fundamentals of Optics*, Jenkins & White, McGraw Hill (1957) Chapter 25, pp. 509–533.
"Polarization", by J. M. Bennett & H. E. Bennett, in *Handbook of Optics*, W. G. Driscoll, Ed., McGraw-Hill (1978) pp. 10-1 to 10-12.

*Primary Examiner*—Rodney B. Bovernick
*Assistant Examiner*—Terry S. Callaghan
*Attorney, Agent, or Firm*—Bobby D. Scearce; Donald J. Singer

[57] ABSTRACT

An achromatic infrared retarder is described which comprises a substrate supporting an optically reflective surface, two identical prisms of preselected optical material disposed in confronting relationship with the reflecting surface therebetween and defining an optical axis through the prisms along which a light beam is selectably directable, each prism having a first optical surface orientable perpendicular to the optical axis, a second optical surface disposed at a preselected angle to the first surface, and a third optical surface disposed at the preselected angle to the second surface, the angle preselected in size corresponding to the material comprising the prisms in order to provide total internal reflection of a light beam directed along the axis at the second surface, the prisms being disposed so as to define a region bounded by respective third optical surfaces of the prisms and the reflective surface therebetween.

4 Claims, 1 Drawing Sheet

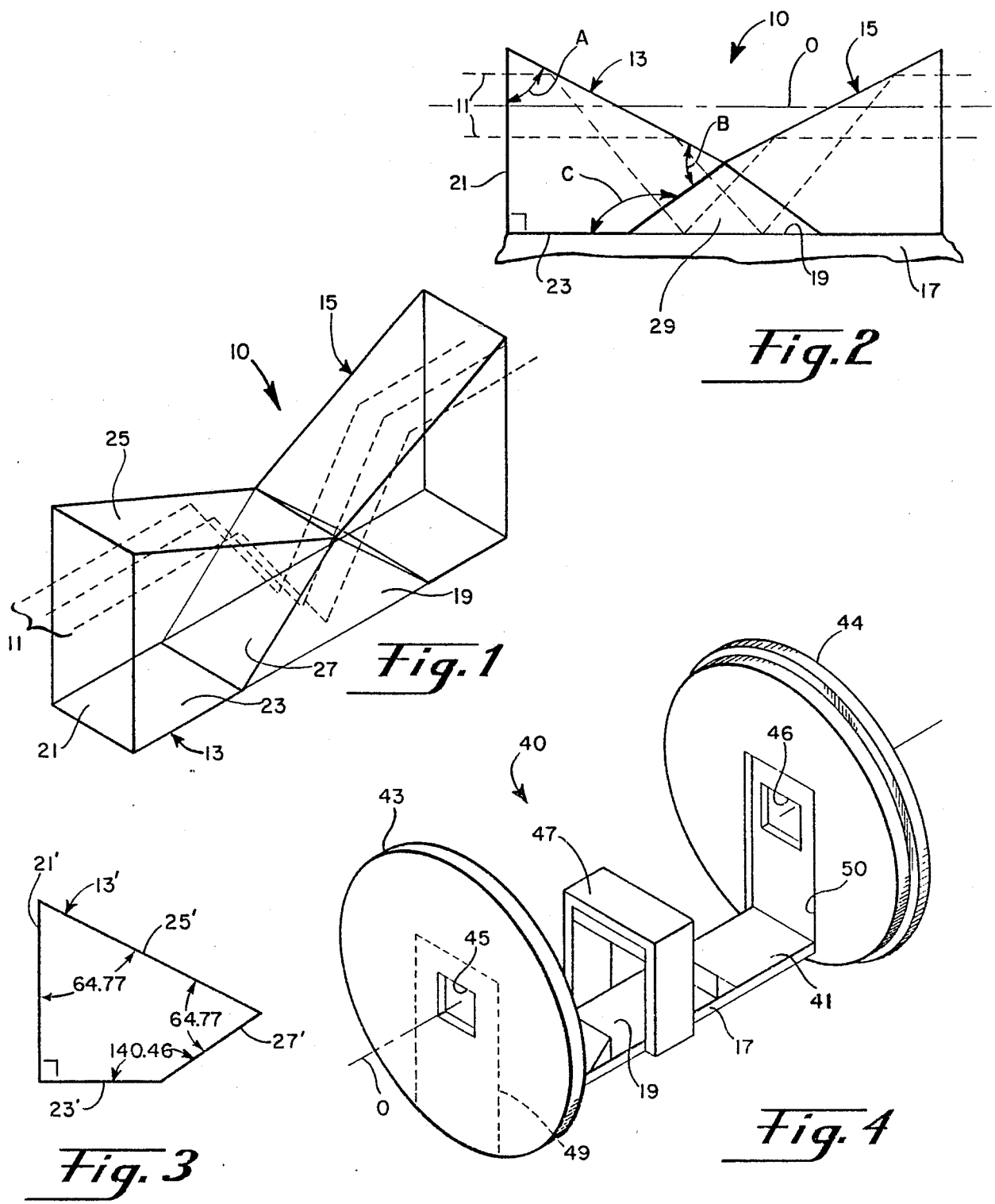

ACHROMATIC INFRARED RETARDER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical polarizing devices, and more particularly to an achromatic infrared retarder configured to produce a phase delay of one component of polarized light with respect to the orthogonal component over a large wavelength interval in the infrared without producing beam deviation.

An optical retarder is an optical element designed to retard one linear polarization component with respect to the orthogonal component so as to produce a selected phase shift between the two components. Two types of retarder in common use are the total internal reflection prism and the waveplate. In the total internal reflection prism a specific phase shift occurs between the s and p components of light (linear retardance) on total internal reflection, depending on refractive index (usually wavelength dependent) of the material comprising the prism. The retardance of the prism is independent of thickness and variation of retardance with wavelength is substantially less than that of the waveplate. A common retarder of the prism type is known as a Fresnel rhomb, which has desirably low wavelength dependence but has undesirably large beam offset associated with its use and is undesirably large; for example, a Fresnel rhomb for the infrared made of zinc selenide (ZnSe) having a clear aperture of 0.95 inch has a beam offset of 1.66 inches and a length of 3.65 inches.

The waveplate retarder consists of a plane parallel plate of birefringent material with the crystal axis oriented perpendicularly to the intended propagation direction of an incident light beam. In the waveplate retarder, plate thickness is selected such that plate thickness times the birefringence (difference between the ordinary and extraordinary refractive indices of the plate material) equals an integral number of quarter wavelengths of the incident beam. For an odd integer number, a quarter wave retarder obtains; for the integer equal to one, the plate is very thin and is referred to as a zero order waveplate. Retardance of the zero order waveplate necessarily varies with wavelength unless by coincidence the birefringence is linearly proportional to wavelength. Since this does not occur in practice, the waveplate has only approximately a quarter wave retardance over a small wavelength range. For higher order waveplates (odd integer greater than one) the effective wavelength range for quarter wave retardance is even smaller. The achromatic range of a waveplate retarder can be enlarged with combinations of waveplates of positive and negative birefringent materials at right angles and balancing birefringence variations with wavelength. This method is feasible in the visible, but less birefringence data is available to readily produce designs of a device for the infrared.

The invention solves or substantially reduces in critical importance shortcomings in prior art devices as suggested above by providing an achromatic infrared retarder designed to produce a phase delay of one polarized light component with respect to the orthogonal component and wherein the output and input beams of the retarder are colinear. The invention comprises two identical prisms of selected configuration mounted in confronting relationship on a substrate such that a transmitted beam experiences a total internal reflection in each prism and one total reflection at a reflective surface on the substrate between the prisms. With proper design, the output beam has a quarter wave linear phase delay and changed polarization relative to the input beam. Linearly polarized light can be converted to circularly polarized light and vice-versa because of the quarter wave phase delay produced in the transmitted beam. The invention is useful over a wide wavelength range (viz, 3-14 microns) and has particular application in spectropolarimeters for determining polarization properties of materials, multiple-wavelength laser polarimeters, or ellipsometers for determining thin film thickness and refractive index.

It is therefore a principal object of the invention to provide an improved optical retarder device.

It is another object of the invention to provide an achromatic infrared retarder for producing a phase delay of one component of polarized light with respect to the orthogonal component over a large range of wavelengths.

It is yet a further object of the invention to provide an achromatic infrared retarder wherein the input and output beams are colinear.

These and other objects of the invention will become apparent as the detailed description of representative embodiments proceeds.

SUMMARY OF THE INVENTION

In accordance with the foregoing principles and objects of the invention, an achromatic infrared retarder is described which comprises a substrate supporting an optically reflective surface, two identical prisms of preselected optical material disposed in confronting relationship with the reflecting surface therebetween and defining an optical axis through the prisms along which a light beam is selectably directable, each prism having a first optical surface orientable perpendicular to the optical axis, a second optical surface disposed at a preselected angle to the first surface, and a third optical surface disposed at the preselected angle to the second surface, the angle preselected in size corresponding to the material comprising the prisms in order to provide total internal reflection of a light beam directed along the axis at the second surface, the prisms being disposed so as to define a region bounded by respective third optical surfaces of the prisms and the reflective surface therebetween.

DESCRIPTION OF THE DRAWINGS

The invention will be clearly understood from the following detailed description of representative embodiments thereof read in conjunction with the accompanying drawings wherein:

FIG. 1 shows a perspective view of an assembly of prisms comprising the infrared retarder of the invention;

FIG. 2 is a side view of the retarder of FIG. 1;

FIG. 3 is a side view of a representative prism of the invention defining the angles between faces thereof; and FIG. 4 shows a representative mounting for the invention.

DETAILED DESCRIPTION

Referring now to the drawings, FIG. 1 shows in perspective an assembly of prisms comprising the infrared retarder 10 of the invention. FIG. 2 is a side view of retarder 10 of FIG. 1 best showing the passage of a light beam 11 therethrough. FIG. 3 is a representative prism of retarder 10 defining the angles between the faces for a particular embodiment of the invention.

Retarder 10 comprises two identical prisms 13,15 mounted in confronting relationship as suggested in FIGS. 1, 2 on a substrate 17 defining and supporting a reflective surface 19. Prisms 13,15 are each configured with a first optical surface 21 providing an entry window for light beam 11 disposed at a right angle (90°) to surface 23 resting on surface 19 of substrate 17. Each prism is further defined by optical surfaces 25,27. Angle A between surfaces 21,25 angle B between surfaces 25,27 and angle C between surfaces 23,27 of each prism 13,15 are defined according to the refractive index of the material comprising the prisms according to principles of operation of retarder 10 as hereinafter more fully described.

Prisms 13,15 are disposed in confronting relationship as shown in FIGS. 1, 2 to define therebetween region 29 open to ambient (air) bounded by surfaces 27 of prisms 13,15 and reflective surface 19. Reflective surface 19 may comprise any suitable material as would occur to the skilled artisan guided by these teachings, such as gold, silver, copper, lead or aluminum, gold being a preferable material because of the excellent reflective properties thereof in the infrared. Prisms 13,15 may comprise any suitable optical material selected primarily for high transmission in the 3 to 14 micron wavelength region, and homogeneity. The material should have an index of refraction which allows a large phase shift at reasonable incidence angles; i.e., if the index is too low, geometrical considerations may make construction of the device impractical. Suggested materials all have indices greater than 2.0. Accordingly, zinc selenide, zinc sulfide, germanium, arsenic trisulfide glass, or gallium arsenide may be desirable materials for prisms 13,15. The selected materials for the prisms and the mirror then dictate the respective sizes of angles A,B,C in order to provide the desired net phase shift, and the required phase retardance at prism/air interfaces at surfaces 25 of each prism.

The net retardance for retarder 10 is the sum of retardances from both internal reflections (surfaces 25) and an external metal reflection (surface 19). A specific geometry of retarder 10 will depend on choice of prism 13,15 material, metal selected for reflective surface 19, and retardance that is required. The phase changes on total internal reflection for the s and p components of the incident polarized light (e.g. beam 11) are (F. Jenkins and H. White, *Fundamental of Optics*, 3rd Ed, McGraw-Hill (1957) p 515), $$\delta_s^{prism} = 2\tan^{-1}\frac{(n^2\sin^2\phi - 1)^{\frac{1}{2}}}{n\cos\phi}$$

$$\delta_p^{prism} = 2\tan^{-1}\frac{n(n^2\sin^2\phi - 1)^{\frac{1}{2}}}{\cos\phi}$$

so that the net phase shift for a single internal reflection is, $$\Delta^{prism} = \delta_p^{prism} - \delta_s^{prism}$$

The phase shifts on reflection from metal surface 19 are (J. E. Bennett and H. E. Bennett, "Polarization", in *The Handbook of Optics*, Driscoll and Vaughan Eds, McGraw-Hill (1978)), $$\delta_s^{metal} = \tan^{-1}\frac{2\eta_{os}b}{\eta_{os}^2 - (a^2 - b^2)}$$

$$\delta_p^{metal} = \tan^{-1}\frac{-2\eta_{op}d}{c^2 - d^2 - \eta_{op}^2}$$

where, $$\eta_{os} = \eta_o\cos\theta_o$$
$$\eta_{op} = \eta_o/\cos\theta_o$$

$$a^2 - b^2 = ((n_1^2 - k_1^2 - n_o^2\sin^2\theta_o)^2 - 4n_1^2k_1^2)^{\frac{1}{2}}$$
$$c^2 + d^2 = (n_1^2 - k_1^2)^2/(a^2 - b^2)$$

$$b = \left(\frac{(a^2 - b^2)}{2} - \frac{(n_1^2 - k_1^2 - n_o^2\sin^2\theta_o)}{2}\right)^{\frac{1}{2}}$$

$$d = b\left(1 - \frac{n_o^2\sin^2\theta_o}{a^2 - b^2}\right)$$

and where $n_o$ is the refractive index of the incident medium, $\theta_o$ is the angle of incidence, and $n_1$ and $k_1$ are the index of refraction and extinction index for the metal mirror, respectively. The net retardance $\delta$ of retarder 10 then is, $$\delta = 2\Delta^{prism} + \Delta^{metal}.$$

where $\Delta^{metal} = \delta_p^{metal} - \delta_s^{metal}$.

Referring now to FIG. 3, shown therein is a prism configuration according to the invention defining angles A,B,C for ZnSe. Prism 13' of FIG. 3 has characteristic dimensions of 1.7 inches (surface 21'), 2.2 inches (surface 25'), and 1.08 inches (surface 23'), and two such prisms mounted in confronting relationship have overall length of 4.00 inches. The retarder of the invention (viz, FIG. 3) typically has a square clear aperture about 0.5 inch on each side, although it may be structured to substantially any scale as would occur to one skilled in the art guided by these teachings.

In the operation of the retarder according to its intended function, optical beam 11 is directed along optical axis O normal to surfaces 21 of confronting prisms 13,15. Material for prisms 13,15 and angles A,B,C are selected so that beam 11 experiences a total internal reflection at surface 25 within each prism. A characteristic phase delay between orthogonal beam components is generated at the total internal reflection. The configuration shown in FIG. 3 with ZnSe as the optical material comprising the prisms and a surface 19 of gold results in a nominal quarter wave (90°) phase delay for the total path in retarder 10. The actual retardations at integral wavelength values for retarder 10 of FIGS. 1, 2 including ZnSe prisms 13,15 and gold mirror 19 configured according to FIGS. 2 and 3 are given in TABLE I.

TABLE I

| Wavelength (microns) | ZnSe Index | Gold n | Gold k | Total Phase Shift |
|---|---|---|---|---|
| 3 | 2.440 | 0.704 | 21.8 | 88.39 |
| 4 | 2.435 | 1.25 | 29.0 | 89.03 |

TABLE I-continued

| Wavelength (microns) | ZnSe Index | Gold n | Gold k | Total Phase Shift |
|---|---|---|---|---|
| 5 | 2.432 | 1.95 | 36.2 | 89.42 |
| 6 | 2.428 | 2.79 | 43.4 | 89.66 |
| 7 | 2.423 | 3.79 | 50.5 | 89.81 |
| 8 | 2.418 | 4.93 | 57.6 | 89.91 |
| 10 | 2.407 | 7.62 | 71.5 | 90.02 |
| 12 | 2.394 | 10.8 | 85.2 | 90.04 |
| 14 | 2.378 | 14.5 | 98.6 | 89.98 |

The total phase shift is a sum of two internal reflections and one air-to-metal reflection. For example, at 10 microns retardation from a single total internal reflection is 45.43° and the air to gold reflection results in a −0.83° retardation. Angles A,B,C suggested in FIG. 3 were selected to provide retardance nearer 90° in the 10 micron region than the 3–5 micron region. It is noted that alternative angle configurations may be selected in order to optimize retardance for any particular wavelength by changing prism angles slightly so that substantially exact 90° retardance obtains at any wavelength desired in the 3–14 micron region.

Referring now to FIG. 4, shown therein is a representative mounting structure for the prisms comprising the retarder of the invention. Mounting 40 includes a base 41 including substrate 17 supporting reflective surface 19 (FIG. 1) and a pair of end disks 43,44 defining respective apertures 45,46 along axis O. Centrally positioned internally cushioned yoke 47 and recesses 49,50 in end disks 43,44 provide representative positioning means for prisms within mounting 40. It is noted that the entire mounting 40 may be installed in or attached to a rotatable structure (not shown) in order to selectively position a retarder of the invention as installed in mounting 40 about axis O. As suggested above, the invention has substantial non-limiting use in an infrared polarimeter or spectropolarimeter for measurement of polarization properties of materials. Accordingly, the retarder of the invention may desirably be installed in a rotating mount under computer control to selectively rotate the retarder to any set of desired positions in any sequence.

The invention therefore provides a novel achromatic infrared retarder which produces achromatic quarter wave linear retardance over a large wavelength interval in the infrared with no beam deviation between input and output beams directed through it. It is understood that modifications to the invention as described may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An achromatic infrared retarder device, comprising:
   (a) a substrate supporting an optically reflective surface;
   (b) two identical prisms of preselected optical material disposed in confronting relationship on said reflecting surface, said prisms defining an optical axis through said prisms;
   (c) each of said prisms being defined by a first optical surface perpendicular to said optical axis, a second optical surface intersecting said optical axis and oriented at a preselected angle to said first optical surface, and a third optical surface disposed at said preselected angle to said second optical surface, said preselected angle selected in size corresponding to said optical material comprising said prisms whereby a total internal reflection of a light beam directed along said optical axis results at said second optical surface; and
   (d) said prisms in said confronting relationship defining a region bounded by respective third optical surfaces of said prisms and said optically reflective surface.

2. The device of claim 1 wherein said optically reflective surface comprises a material selected from the group consisting of gold, silver, copper, lead, and aluminum.

3. The device of claim 1 wherein said prisms comprise an optical material selected from the group consisting of zinc selenide, zinc sulfide, germanium, arsenic trisulfide glass, and gallium arsenide.

4. The device of claim 1 wherein said optical material has an index of refraction greater than 2 for transmission of light in the 3–14 micron range.

* * * * *